United States Patent
Golden et al.

[11] Patent Number: 6,052,447
[45] Date of Patent: *Apr. 18, 2000

[54] METHOD AND APPARATUS FOR AGGREGATING CUSTOMER INFORMATION FOR A TELECOMMUNICATIONS SYSTEM

[75] Inventors: Paul Antony Golden, Overland Park, Kans.; Peter James Kosich, Kansas City, Mo.; Stacy Lynn Rector, Dallas, Tex.

[73] Assignee: Sprint Communications Company L.P., Kansas City, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/070,138

[22] Filed: May 28, 1993

[51] Int. Cl.[7] .................................................. H04M 15/00
[52] U.S. Cl. ........................ 379/114; 379/112; 379/120; 379/121
[58] Field of Search ...................... 379/112, 113, 379/114, 115, 118, 121, 124, 133, 134, 139, 201, 207, 220, 221, 120, 125, 126, 128, 135, 144

[56] References Cited

U.S. PATENT DOCUMENTS

| | | | |
|---|---|---|---|
| 4,538,030 | 8/1985 | Fossett et al. | 379/114 |
| 4,979,207 | 12/1990 | Baum et al. | 379/112 |
| 5,027,388 | 6/1991 | Bradshaw et al. | 379/112 |
| 5,159,698 | 10/1992 | Harrington et al. | 379/120 |
| 5,325,290 | 6/1994 | Cauffman et al. | 379/112 |
| 5,333,184 | 7/1994 | Doherty et al. | |

FOREIGN PATENT DOCUMENTS

WO91/03023  3/1991  United Kingdom ............ G06F 15/30

OTHER PUBLICATIONS

AT&T Communications, Bridgewater, NJ 08807, Adm. Rates and Tariffs, TARIFF F.C.C. No. 1, 3rd Revised p. 178.69.1 Cancels 2nd Revised p. 178.69.1, Effective: Jan. 5, 1993, Issued: Dec. 22, 1992.

AT&T Communications, Bridgewater, NJ 08807, Adm. Rates and Tariffs, TARIFF F.C.C. No. 1, 15th Revised p. 178.63, Cancels 14th Revised p. 178.63, Effective: Sep. 28, 1993, Issued Sep. 14, 1993.

MCI Telecommunications Corporation, TARIFF F.C.C. No. 1, 14th Revised p. No. 18.29, Cancels 13th Revised p. No. 18.29, Effective: Jul. 1, 1993, Issued Jun. 17, 1993.

*Primary Examiner*—Curtis A. Kuntz
*Assistant Examiner*—Binh K. Tieu
*Attorney, Agent, or Firm*—Harley R. Ball; Bruce C. McClelland

[57] ABSTRACT

This invention relates to a method and apparatus for aggregating customer information for a telecommunications system. Call information is received from the network and integrated with customer information which is stored in network databases. The customer information includes indicators which signify that particular customer applications that should be applied. One application can identify patterns of network usage, including the called number which receives a customer's largest volume of traffic, and applying a discount to all of the customer's calls that fit within the pattern. The network's processing system takes the integrated information and applies the indicated customer application at a call level. This process results in aggregated customer information.

23 Claims, 4 Drawing Sheets

METHOD AND APPARATUS FOR AGGREGATING CUSTOMER INFORMATION FOR A TELECOMMUNICATIONS SYSTEM

BACKGROUND OF THE INVENTION

1. Field of the Invention

This invention relates generally to telecommunications systems, and specifically to aggregating customer information in relation to use of the telecommunications network.

2. Description of the Prior Art

Customer information is important to any commercial enterprise. The field of telecommunications is no exception, and this field is becoming increasingly based on individual customer applications. For example, a common application is to give customers better calling rates for their larger volumes of traffic. In order to implement these applications, pertinent individualized customer information must be collected and put into a usable format. Often, this information is based on customer use of the network, i.e. their larger volumes of traffic. At present, telecommunications systems ask the customer to predict the pertinent information prior to using it in a particular application.

For example, some systems require that the customer select in advance the area code to which they will direct the largest amount of their traffic. If the predicted area code does not actually receive the largest amount of traffic, the customer loses value. Other systems require that the customer select in advance a limited number of destination numbers to which they will direct the largest amount of traffic. If the actual destination numbers that receive the largest amount of traffic are not on the predicted list, the customer loses value. Further, these systems may require that the chosen destination numbers also be customers of the same interexchange carrier. In this case, even if a predicted destination number receives the largest amount of the customer's traffic, no benefit to the customer will apply. Additionally, since the customer is only concerned if a number on the limited list of destination numbers is a customer, the customer has no motivation to encourage others to become customers of their interexchange carrier. This is a disadvantage to the interexchange carrier.

As a result, the customer must accurately predict the future telecommunications use which forms the basis for the customer information used in an application. Often, these predictions, i.e. their larger volumes of traffic, are not accurate, and value from an application is lost. In any event, the application is not maximized.

Telecommunications systems do not select customer information which is based on the use that is the subject of a particular application. The best customer information for a particular application is information based on the customer activity which is subject to the application. At present, customer information must be predicted prior to this activity.

Some systems have also provided post-billing information to a customer. These systems accumulated the information for use in interpreting the billing information, and for use in planning future calling activity. These systems did not aggregate information to be used directly in a customer application, such as billing. In other words, these systems accumulated customer information from a bill, but they did not aggregate customer information prior to billing that could be used for billing purposes.

SUMMARY OF THE INVENTION

This invention solves the problem posed by customer predictions of their future telecommunications network use with a method of aggregating customer information. Call information is received from a telecommunications network. Additionally, databases of customer information are maintained and indexed. The call information and customer information are integrated into a single record using the index. Each customer's patterns of network use are identified based on the integrated information. Discounts are applied to calls which fit the identified patterns. The patterns may be the largest amount of calls, call time, or call cost.

BRIEF DESCRIPTION OF THE DRAWINGS

These and other features of the present invention will become better understood in relation to the following description, claims, and drawings. The drawings are:

DETAILED DESCRIPTION

Figure 1:
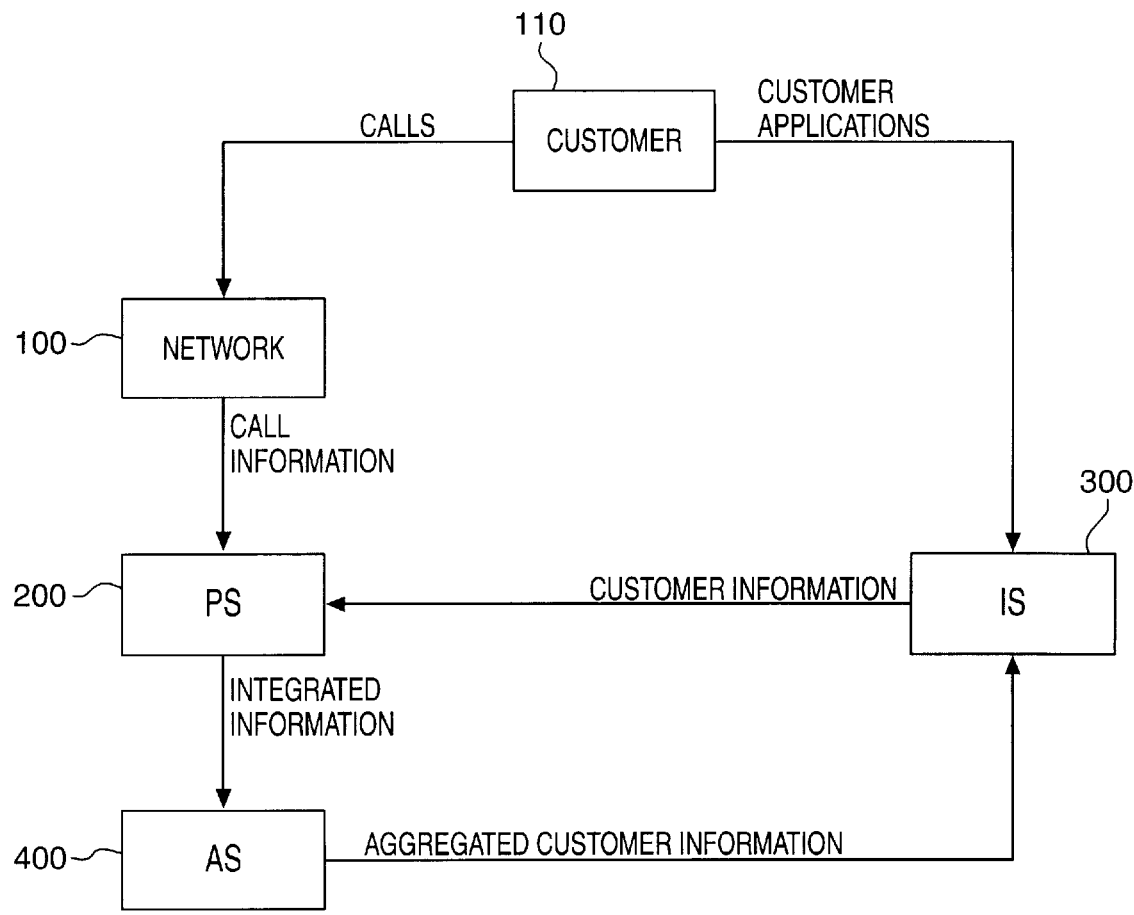
FIG. 1 is a block diagram of the method for aggregation of customer information.

As shown in FIG. 1 the main elements in the process interact as follows. Telecommunications Network (Network) 100 is used by customer 110 to place a call. Although Customer 110 may be a large business, typically Customer 110 is an individual consumer of network connections. Network 100 transmits call information to Processing System (PS) 200. PS 200 also receives customer information from Information System (IS) 300. This information identifies the customer and the different customer applications that may apply. PS 200 integrates the call and customer information and transmits the record to Accounting System (AS) 400. AS 400 processes the integrated information to form aggregated customer information which it transmits to IS 300.

Figure 2:
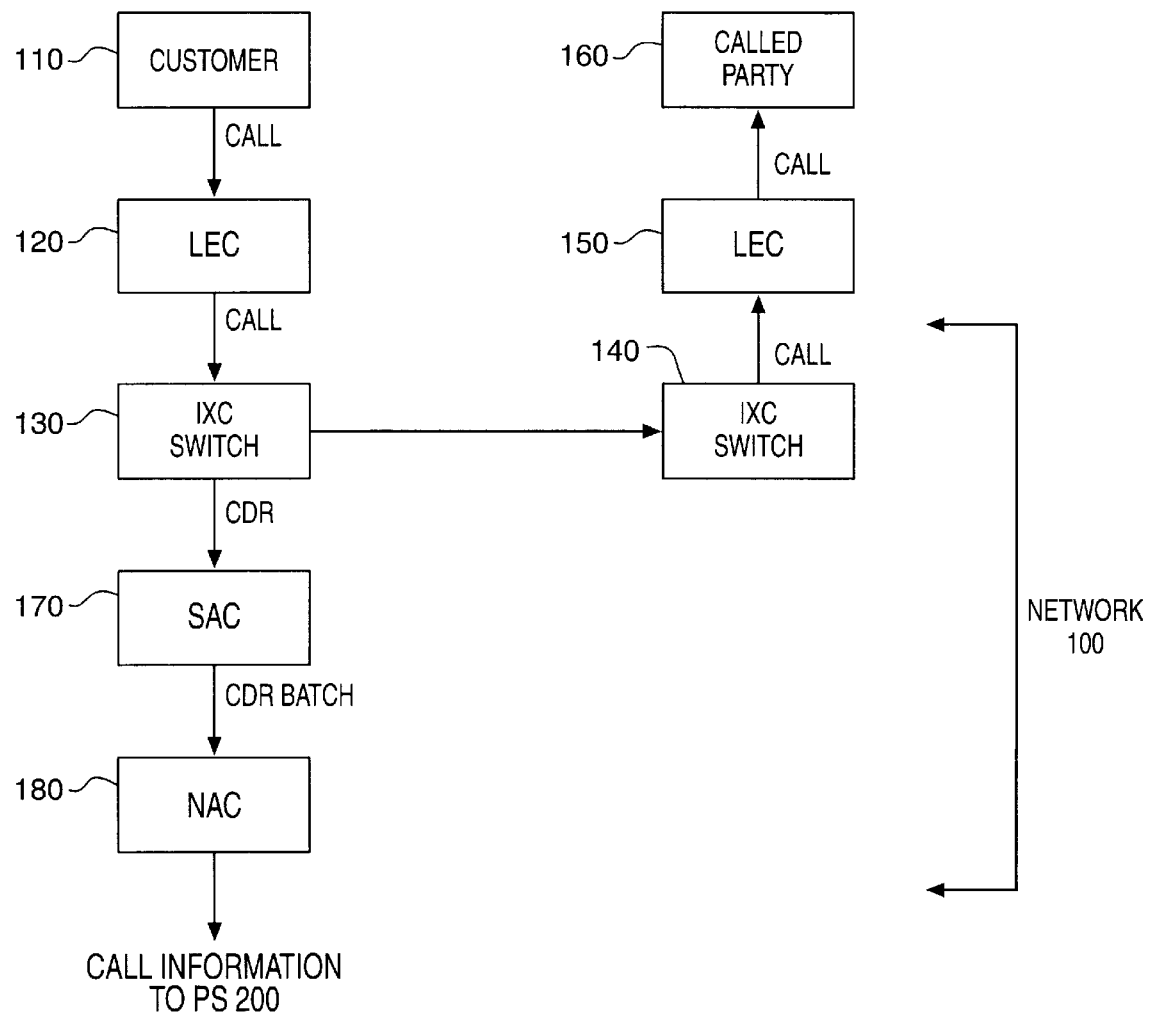
FIG. 2 is a block diagram of the telecommunications network.

As shown in FIG. 2, Network 100 provides PS 200 with call information in the following manner. Customer 110 places a call which typically will be handled by Local Exchange Carrier (LEC) 120 before being transferred to Inter Exchange Carrier (IXC) Switch 130. Those skilled in the art will recognize other methods to connect calls between a party and an IXC switch. IXC Switch 130 routes the call to IXC Switch 140, and the call is then given to LEC 150 to deliver to Called Party 160. The terminating switch, IXC Switch 140, signals the originating switch, IXC Switch 130, when the call is completed, and IXC switch 130 generates call information in the form of a Call Detail Record (CDR). Those skilled in the art are familiar with the contents of the CDR. The CDR is transmitted to Site Area Computer (SAC) 170 which batches all of the call information from the IXC switches. Network Access Computer (NAC) 180 is the interface with PS 200. It receives the batch of CDRs from SAC 170 and configures them into a processed batch for transmission to PS 200.

Figure 3:
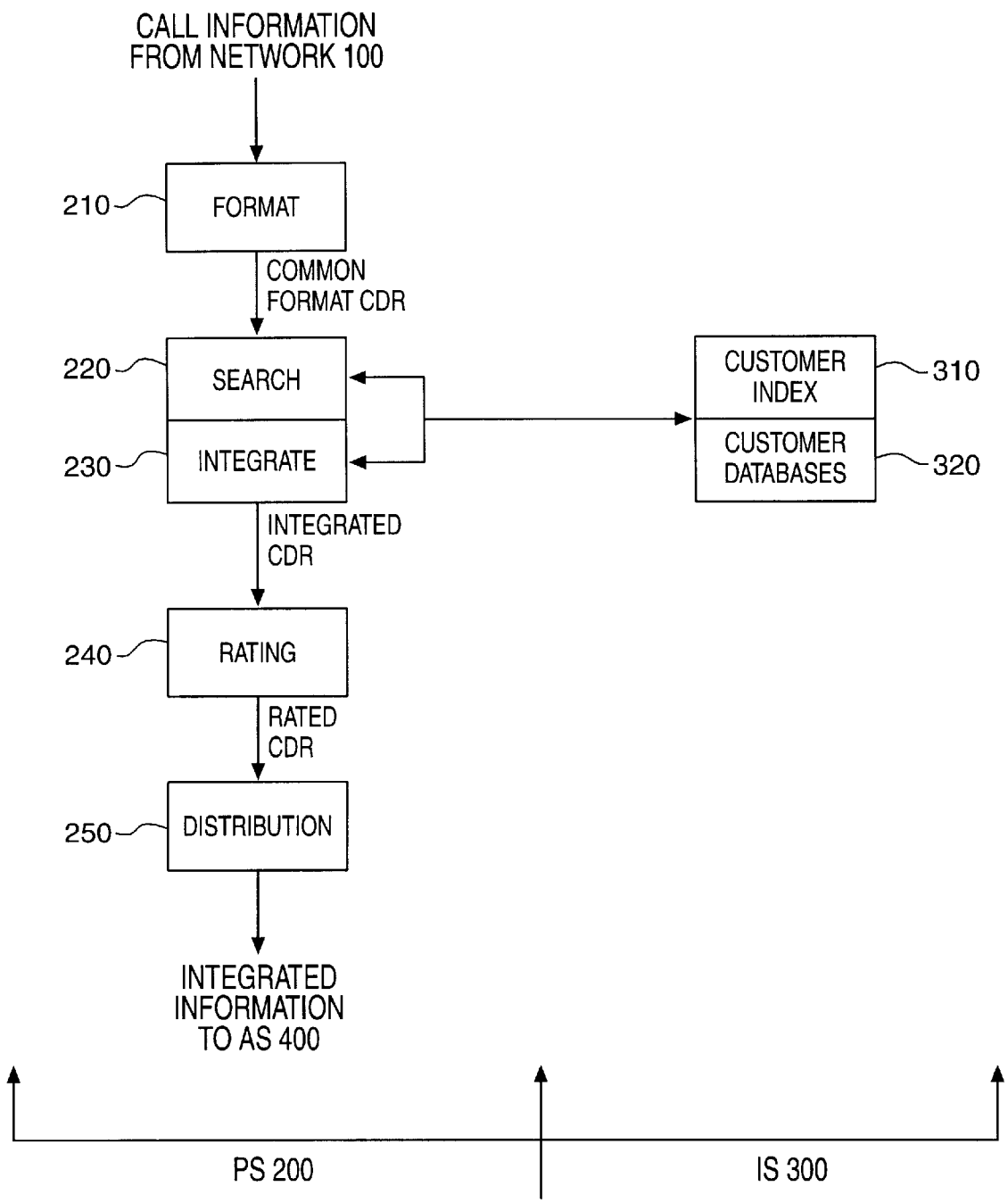
FIG. 3 is a block diagram of the processing system and the information system.

As shown in FIG. 3, PS 200 provides AS 400 with integrated customer information in the following manner. Call information is received from Network 100 by Format 210. Format 210 rejects unbillable CDRs and reconfigures the remaining CDRs into a common format that is compatible with further processing. The common format is set up to provide fields for each piece of information. Each system is instructed as to where each field is located in the CDR, and what the codes mean for each field.

The common format CDRs are then accepted by Search 220. Search 220 is provided with Customer Index 310 by IS 300. Customer Index 310 contains a list of customers and their respective locations in Customer Databases 320. Customer databases 320 contain customer information which identifies the customer from the CDR and also indicates any customer applications. IS 300 maintains the Customer Index 310 and Customer Databases 320 with information from Customer 110, PS 200, and AS 400.

Search 220 uses call information from the CDR to scan Customer Index 310 for the proper database location. The call information may be the calling number. Integrate 230 uses the location found by Search 220 to retrieve customer information from the proper database in Customer Databases 320. The customer information contains the indicators for the different customer applications and is integrated into the CDR by integrate 230. As a result, the integrated CDR contains an indicator for each customer application.

The integrated CDR is then transmitted to Rating 240 which adds tariff information. The tariff information is used to calculate the cost of the call and is based on several factors which may include, but is not limited to: the type of call, the time of day, the origination point, and the termination point. After the CDR is rated, it is sent to distribution 250 which separates the CDRs into groups. CDRs from a specific period of time, i.e. a customer's billing cycle, are put in different groups. Distribution 250 then transmits the CDR groups to AS 400.

Figure 4:
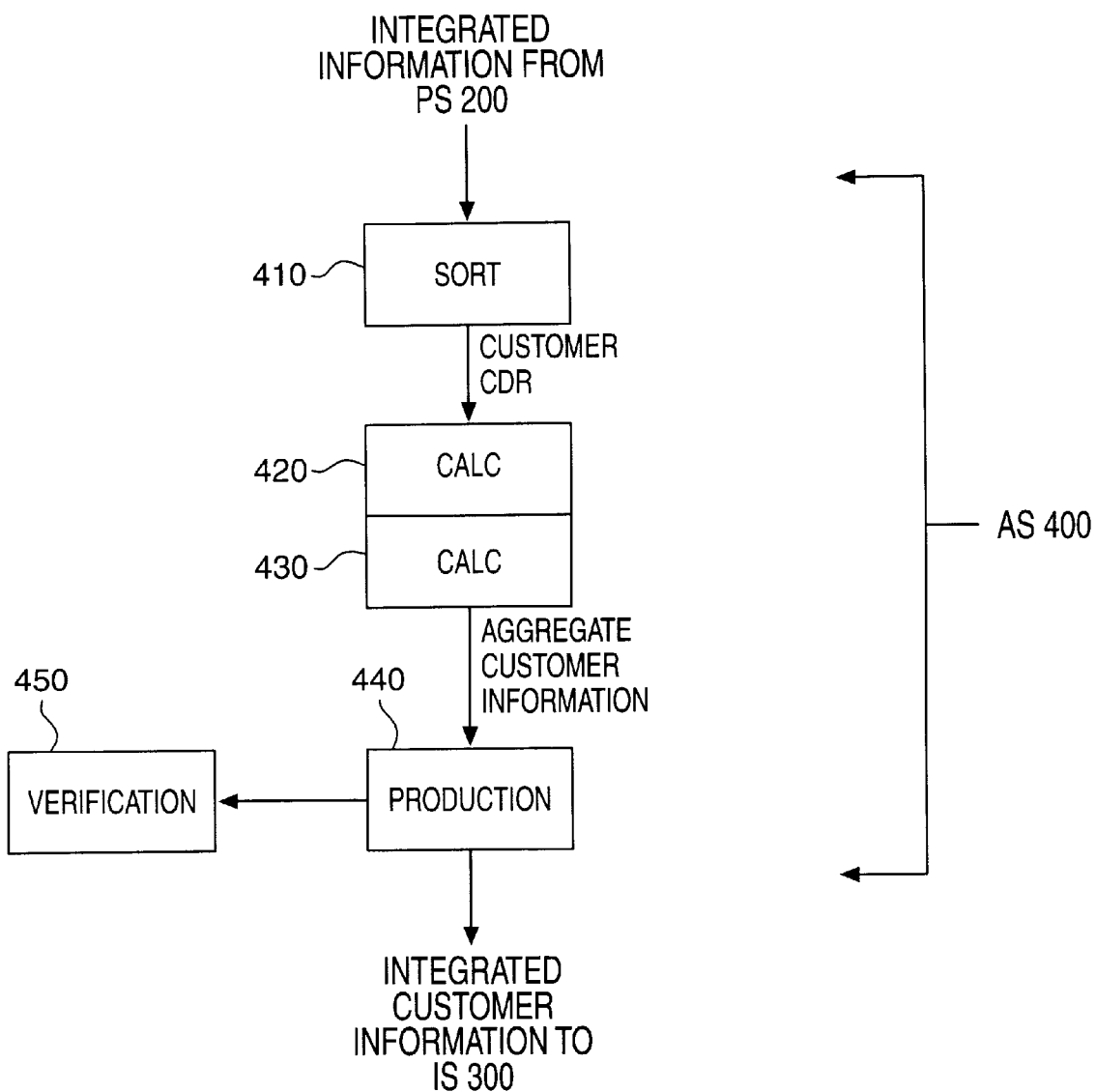
FIG. 4 is a block diagram of the accounting system.

As shown in FIG. 4, AS 400 provides IS 300 with aggregated customer information in the following manner. Integrated information is accepted by Sort 410 which rearranges the CDRs by customer. Each customer's CDR group is then sent to Calc 420. This calculation determines costs and discounts at an account level, such as WATS or 800 services. It also sorts out CDRs with customer application indicators and implements the customer application.

Implementation is based on the rules for the particular customer application that is indicated in the CDR. These rules are designed to identify patterns of use of network connections. These patterns may be based on the volume of use. For example, the total amount of calls to a called number, the total time of calls to a called number, or the total cost of calls to a called number could all be identified. One skilled in the art will appreciate that other patterns could also be identified by the present invention.

The patterns may be identified as corresponding to a particular variable or combination of variables. These variables could be time, area code, State in the United States, geographic region, country, and called number. The pattern may be the largest amount of call activity measured by number, time, or cost of calls within the limits of the variable. For example the pattern may be the called number in Kansas (a state) with the largest amount of call time. Likewise, the pattern may be the variable with the largest amount of call activity measured by number, time, or cost of calls directed to the variable. For example, if Kansas received more call activity from the customer than any other state, the variable indicated by the pattern would be the state of Kansas. The time variable may be a time of day, a day, a week, a month, a year or any combinations of the variables.

The application rules also define which calls are eligible for the application. Eligibility may depend on any information present in the integrated information. For example, eligibility is based on the customer application indicator, and it may be further based on the destination of the call, or the billing plan for the call.

After the initial Calc 420, the customer CDRs enter Calc 430 which calculates costs and discounts which are beneath the account level in a hierarchy. Customer application results from Calc 420 are executed at a call level in Calc 430. Taxes are calculated at the call level after all costs and discounts have been applied.

Calc 420 and Calc 430 identify patters of network use for each customer based on the information in the customer's CDR group and rules defined by the customer application. One such pattern is customer calls to a called number measured by volume. The volume is measured relative to each particular customers's own network use. These characteristics can be used in individual customer applications, such as calculating costs and discounts for high volume traffic. For example, identification of the called number which received the largest amount of connection minutes, the largest number of calls, or which results in the highest bill to the customer. Likewise, other called number patterns may be identified for lower volume use of the customer's called numbers. Called number patterns may also correspond to a time, state, area code, region, or country associated with the called number.

Many patterns can be identified when Calc 420 examines the integrated CDR using customer application rules. The integrated CDR contains indicators which trigger a customer application by Calc 420. The integrated CDR also contains information such as origination and destination locations, the start time and duration of the call, and customer billing information. All of this information can be used to identify customer patterns based on actual use. It is important to point out that this pattern identification is a different concept than just independently examining individual calls to determine if the calls match a pre-selected criteria. This is because groups of calls are being examined together to identify a pattern based on the group information. This is more than examining individual calls and applying a discount based on the information of a single call along with a pre-selected database. It should also be pointed out that this pattern identification is more than just providing a customer with accumulated information along with a bill, since the information from the pattern is actually used in a customer application, such as creating the bill.

Calc 430 produces aggregated customer information which is sent to Production 440 for invoicing, and samples are sent from there to Verification 450 for complete error checks. Production 440 transmits the aggregated customer information to IS 300 for the evaluation of customer applications.

The above method for aggregating customer information can be used to provide the telecommunications system with pertinent customer information based on actual network use. This information can be used in individualized customer applications. It is important to note that the customer information can be based on the same activity that is subject to the application. Present telecommunications systems do not use customer information which is based on the customer activity which is subject to an application. At present, customers must provide this information (i.e. their high volume traffic) prior to implementation of an application. These customers must base the information on predictions of future activity which fails to maximize the value of the application. They cannot rely on the telecommunications system to automatically identify the ideal customer information. The present invention selects the ideal customer information for the customer.

A specific embodiment of the present invention is envisioned as follows and references FIGS. 1–4 accordingly.

Network 100 and Customer 110 agree on customer applications which give Customer 110 a discount for all calls from Customer 110 to the domestic called number with the largest amount of call time. The same application is arranged for international calls. Additionally, a separate discount is provided if the called number is a customer.

Customer 110 places a call through Network 100 which transmits the CDR to PS 200 for reformatting. PS 200 searches Customer Index 310 with CDR information for Customer 110. Using the location found in the index, it retrieves Customer 110 information from Customer databases 320.

Customer databases 320 could be divided into any number of sub-databases. In this embodiment, there are three databases: 1) the largest customers of the previous week, 2) new customers, and 3) all other customers. In this manner, the database of large customers which is used more often can remain more efficient and more easily maintained.

The Customer 110 information that is retrieved from IS 300 by PS 200 is added to the reformatted CDR. This is done by placing indicators in certain fields of the CDR defining the general application type and the specific applications. In this embodiment, these applications would be discounts for the largest amount of call time for both domestic and international calls. Additionally, there is a discount on calls if the customer is eligible for the above application, and the called party is also a customer. As a result, if Customer 110 has the former indicator (a discount for the largest amount of call time) placed in the CDR, PS 200 also runs the called number through the index to determine if the called party is a customer. If the called party is a customer, an indicator of this is placed in the CDR. Those skilled in the art recognize that numerous other applications could be implemented in this manner. After combining the call information with the customer information, the CDR is rated and placed into a CDR group for transmission to AS 400.

AS 400 sorts the CDR groups by customer and they enter Calc 420. Calc 420 does account level costs and discounts for Customer 110's CDR group. It also sorts the CDR group for customer application indicators. If the indicator is present, Calc 420 determines if CDR is eligible for the customer application based on information in the CDR and the application rules. Eligibility may be based on any information in the integrated CDR, i.e. the type of billing arrangement, the origination or destination of the call, or the time of day. Eligible CDRs are then evaluated using the particular customer application rules to identify patterns of use. In this embodiment, the length of each call in the eligible CDR group is accumulated for each called number. Since the CDRs are sorted by indicator, this is done separately for domestic and international indicators. The called numbers with the greatest amount of domestic and international call time are selected and indicated in the CDR.

Customer 110's CDR group then enters Calc 430. Calc 430 applies the customer applications which have been placed in the CDR by Calc 420, or by PS 200. In this embodiment, a discount is applied by Calc 430 to all calls from Customer 110 to the called numbers selected by Calc 420. In this manner, Calc 430 could also apply a discount to any pattern of use identified by Calc 420. Additionally, Calc 430 applies a separate discount if it finds an indicator that the called party was also a customer.

After AS 400 aggregates the call information and customer information, it uses the aggregated customer information for invoicing and verification. AS 400 also provides the aggregated customer information to IS 300 for evaluation of customer applications.

It should be understood that the present invention is particularly advantageous for individual consumers, since in the actual marketplace, called numbers change along with consumer attitudes. With the present invention, patterns of use are identified for the customer, and the customer may benefit through the application of discounts based on the identified patterns of use. The invention does not require pre-selection procedures, and the customer does not lose value because their prediction of future network traffic was not accurate. The consumer is not limited to discounts only on the calls which happen to be directed to a pre-selected area code, or to a number on a pre-selected list. In this invention, the value of a customer application is not based on the accuracy of a customer prediction.

This invention is also advantageous to the network. The invention does not require additional databases of pre-selected information to be used to determine which called numbers meet pre-selected criteria for certain discounts. Customer applications are flexible and can be modified by adding an indicator to the customer information and defining the application rules for the indicator in the processing system. Because the invention uses indexed databases of customer information, the databases can be separated into more efficient modules. The index also provides an efficient means to identify a called party as a customer since the entire database of customer information does not have to be searched. Additionally, the invention provides a discount for any call to another customer and is not limited to a certain area code, or to a limited list of pre-selected called numbers. As a result, customers may always be encouraged to have the parties they call become customer's of the same inter-exchange carrier.

Those skilled in the art will recognize that these are not the only applications facilitated by this method. Any patterns of use of network use, especially those which are relative to each particular customers's own network use, are facilitated by this method. For example, the invention may identify called numbers based on the number of calls rather than the number of minutes to a particular number. Likewise, called numbers may be identified as to a non-customer so that the calling party who is a customer may encourage the called party to become a customer.

It is important to point out that a preferred embodiment of this invention is different in concept and in function than independently examining individual calls to determine if the calls match with a preselected criteria, and then providing discounts based on the match. This embodiment examines entire groups of calls to identify patterns of calling within the group. This analysis is based on group information and is not restricted analysis of information of a single call. Calls that fit into the pattern can then be discounted. Likewise, this embodiment is different than just providing accumulated call information to a customer along with a bill because in this embodiment, aggregated information is used to select the ideal customer information for use in a customer application, such as billing.

We claim:

1. A telecommunications network comprising:
    (a) means for receiving call information including variables associated with calls made by a customer in the network;
    (b) means for processing the call information received over a pre-determined period of time to dynamically identify at least one variable present in the call information by a volume of traffic from the customer to the variable wherein the variable is selected by the network based on a pattern of network use by the customer;

(c) means for applying a discount on the amount to be paid for all calls directed to the variable.

2. The network in claim 1 wherein the volume of traffic is based on a total time of calls in minutes.

3. The network of claim 1 wherein the volume of traffic is based on a total cost of calls in dollars.

4. The network of claim 1 wherein the volume of traffic is based on a total number of calls.

5. The network of claim 1 wherein the variable is a time associated with a call.

6. The network of claim 1 wherein the variable is an area code associated with the called number.

7. The network of claim 1 wherein the variable is a State associated with the called number.

8. The network of claim 1 wherein the variable is a geographic region associated with the called number.

9. The network of claim 1 wherein the variable is a country associated with the called number.

10. The network of claim 1 wherein the pre-determined period of time is a billing period for the customer.

11. A telecommunications network for aggregating customer information which comprises:

(a) means for receiving call information from a telecommunications network;

(b) means for maintaining at least one database of customer information;

(c) means for integrating the call information with the customer information;

(d) means for identifying at least one pattern of network use for a customer based on the integrated information wherein the pattern is dynamically identified by the network;

(e) means for applying a discount on an amount to be paid for all calls directed to a variable identified by the pattern of network use.

12. A computerized method of aggregating customer information for a telecommunications system which comprises:

(a) receiving call information from a telecommunications network;

(b) maintaining at least one database in a computer of customer information;

(c) integrating the call information with the customer information;

(d) identifying in a computer at least one pattern of network use for a customer based on the integrated information wherein the pattern is dynamically identified by the network;

(e) applying a discount on an amount to be paid for all calls directed to a variable identified by the pattern of network use in a computer.

13. The method of claim 12 wherein the step of identifying the pattern of network use further comprises:

(a) determining a total time in minutes of all eligible calls from the customer to each called number;

(b) selecting for the customer the called number with a largest total amount of eligible call time.

14. The method of claim 12 wherein the step of identifying the pattern of network use further comprises:

(a) determining a total cost in dollars of all eligible calls from the customer to each called number;

(b) selecting for the customer the called number with a largest total amount of eligible call cost.

15. The method of claim 12 wherein the step of identifying the pattern of network use further comprises:

(a) determining a total number of all eligible calls from the customer to each called number;

(b) selecting for the customer the called number with a largest total number of eligible calls.

16. The method of claim 12 wherein the step of identifying the pattern of network use corresponds to a time associated with a call.

17. The method of claim 12 wherein the step of identifying the pattern of network use corresponds to an area code associated with a called number.

18. The method of claim 12 wherein the step of identifying the pattern of network use corresponds to a State associated with a called number.

19. The method of claim 12 wherein the step of identifying the pattern of network use corresponds to a geographic region associated with a called number.

20. The method of claim 12 wherein the step of identifying the pattern of network use corresponds to a country associated with a called number.

21. The method of claim 12 wherein the step of identifying the pattern of network use is based on the customer's billing cycle.

22. The method of claim 12, wherein the step of integrating the call information with the customer information further comprises:

(a) maintaining an index to the databases which identifies a location of each customer's information in the databases;

(b) retrieving customer information from the correct database using the location found in the index;

(c) combining the call information and the customer information into a single record.

23. The method of claim 12, wherein the step of integrating the call information with the customer information further comprises checking the database index to determine if a called party is a customer, and adding that determination to the integrated information.

* * * * *